United States Patent
Chambers et al.

(10) Patent No.: US 7,113,787 B2
(45) Date of Patent: Sep. 26, 2006

(54) WIRELESS PRIORITY SERVICE FOR INTERSYSTEM CALL DELIVERY

(75) Inventors: Michael Dwayne Chambers, Plainfield, IL (US); Bonnie Marie Hitzeman, Winfield, IL (US); Rafael Quintero, Naperville, IL (US); Douglas Harvey Riley, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 337 days.

(21) Appl. No.: 10/758,849

(22) Filed: Jan. 16, 2004

(65) Prior Publication Data
US 2005/0159160 A1    Jul. 21, 2005

(51) Int. Cl.
*H04Q 7/20* (2006.01)
(52) U.S. Cl. .................... 455/445; 455/458
(58) Field of Classification Search ........... 455/445, 455/404.1, 414.1, 422.1, 432.1, 433, 435.3, 455/452.1, 458; 379/219, 220.01, 221.01
See application file for complete search history.

(56) References Cited

U.S. PATENT DOCUMENTS

| | | | |
|---|---|---|---|
| 6,505,050 B1 * | 1/2003 | Brudos et al. | 455/458 |
| 6,898,274 B1 * | 5/2005 | Galt et al. | 379/211.02 |
| 2004/0198349 A1 * | 10/2004 | Chin | 455/432.1 |
| 2004/0203573 A1 * | 10/2004 | Chin et al. | 455/404.1 |

* cited by examiner

*Primary Examiner*—Benny Quoc Tieu

(57) ABSTRACT

A method and apparatus for completing a priority call to a wireless border switch. A priority or preemption request is transmitted as part of the signaling messages used to set up a call. A border switch is a switch which is used in conjunction with the switch indicated by the last-seen pointer from an HLR entry for the called terminal to page a called station. The switch indicated by the last-seen pointer transmits the priority request to a border switch, to indicate that the call should be given priority treatment. Further, preemption service for calls terminating on a wireless station can be provided. Advantageously, priority and preemption treatment can be provided for calls originated by wireless or landline stations and terminating on mobile station destinations that are served by a border switch; preemption or priority service can be provided for calls to a wireless station originated from a landline station; and preemption service can be provided for calls to a wireless station from a wireless station.

5 Claims, 3 Drawing Sheets

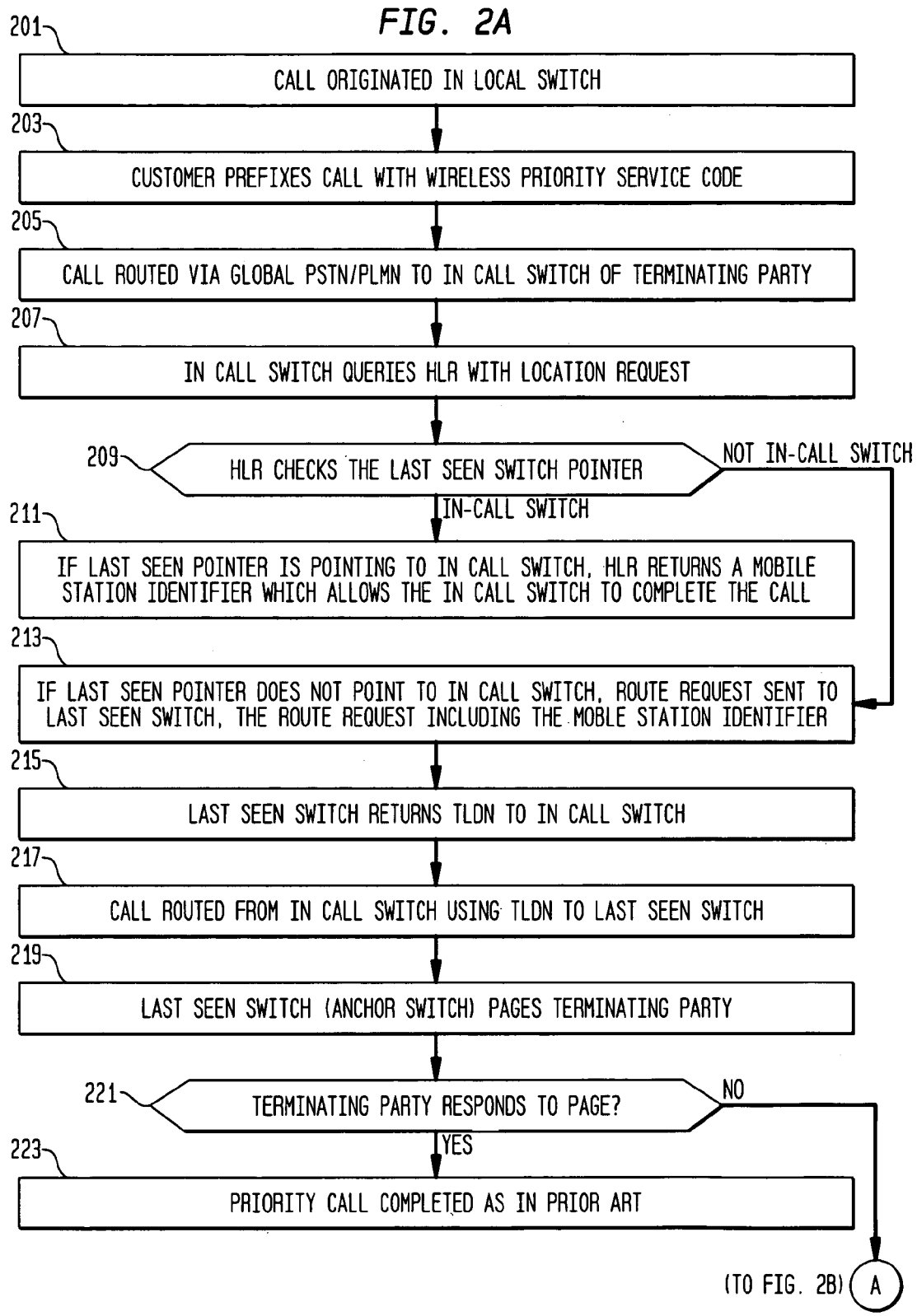

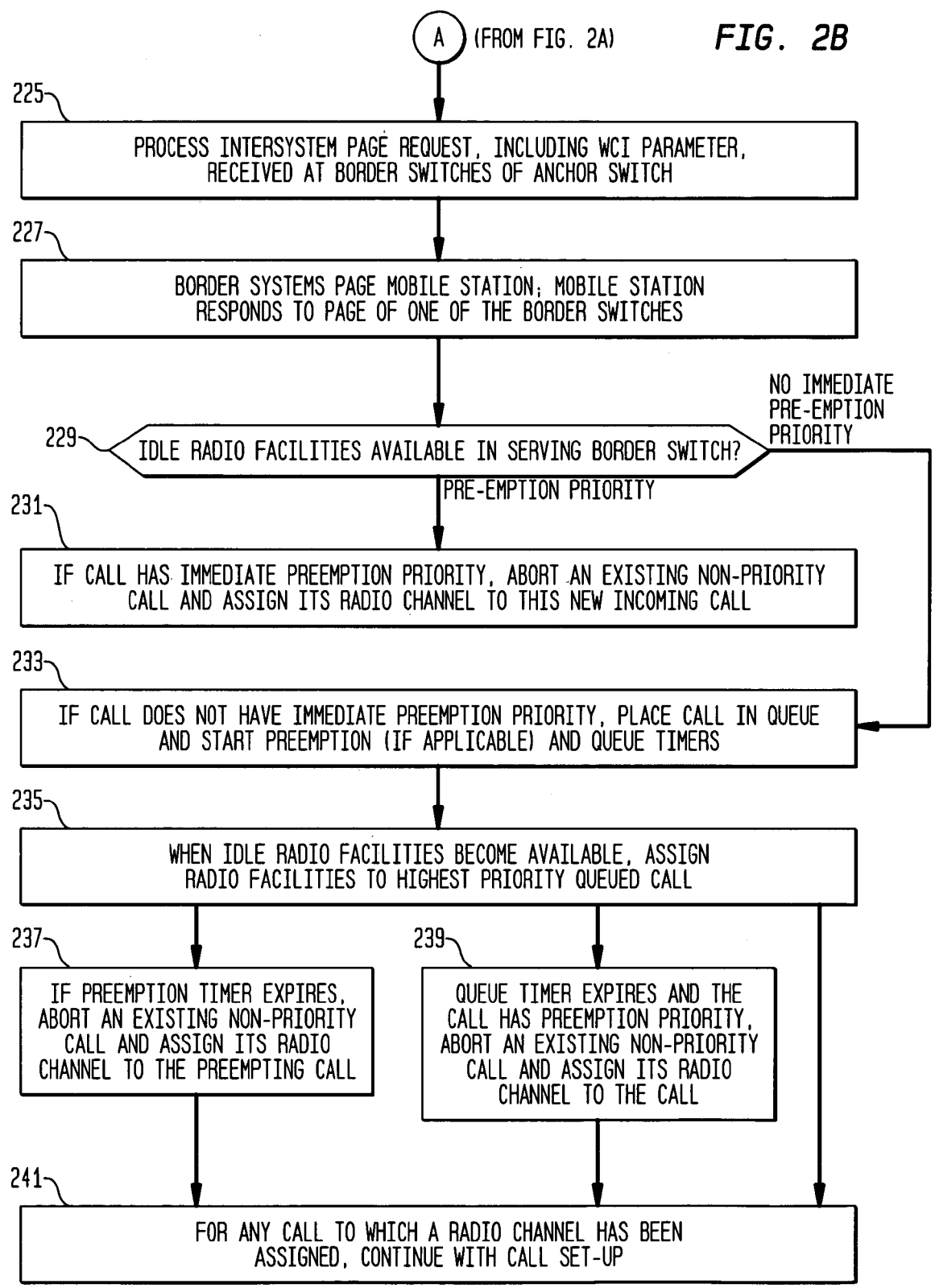

WIRELESS PRIORITY SERVICE FOR INTERSYSTEM CALL DELIVERY

TECHNICAL FIELD

Figure 1:
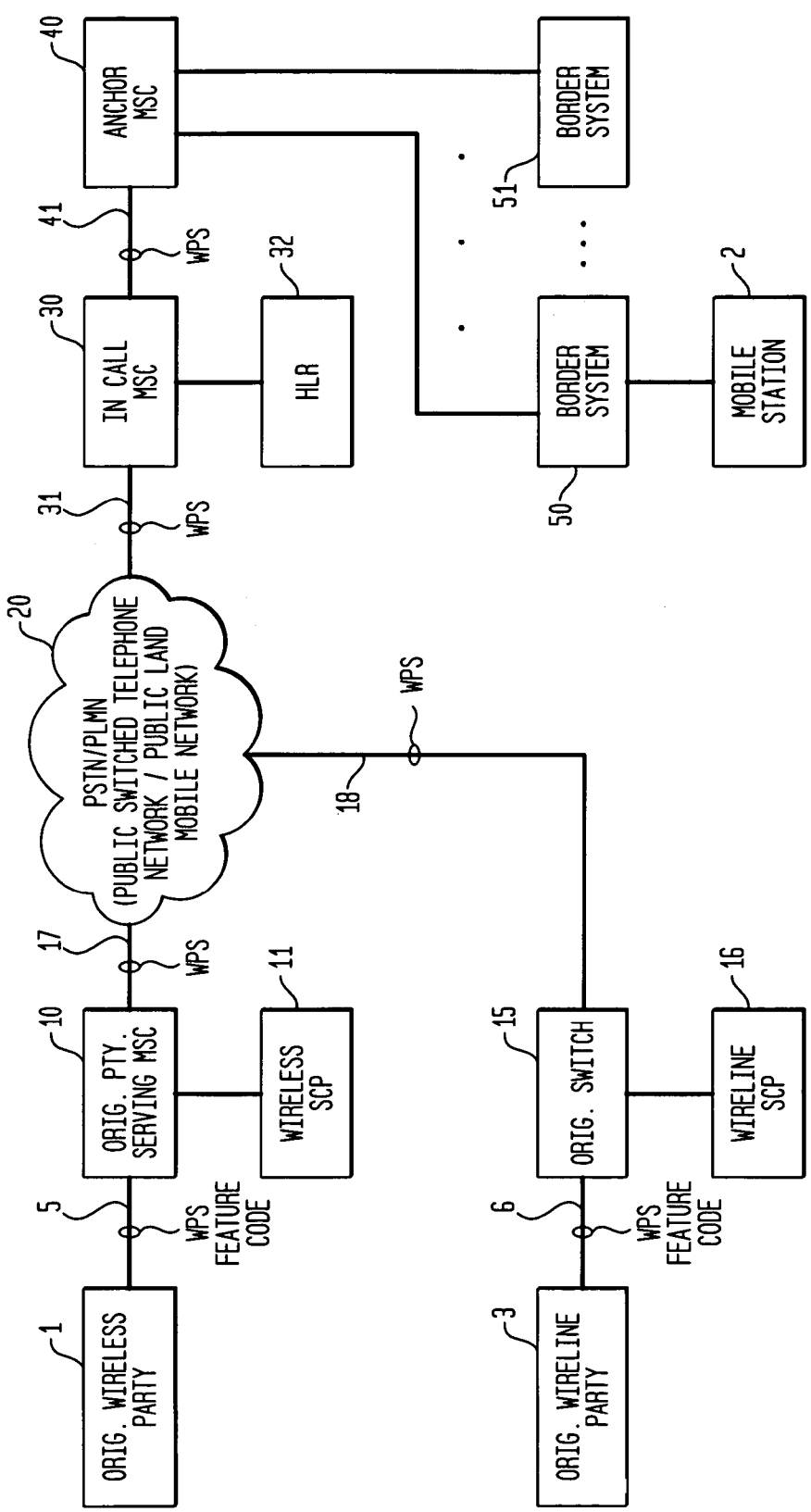

This invention relates to the provision of priority service for calls to terminating wireless stations.

BACKGROUND OF THE INVENTION

Wireless priority service is a service for giving priority to critical wireless station originated calls and critical calls terminated on wireless stations (originated by either wireless or wireline stations). On origination, the priority service is invoked by a wireless caller dialing a wireless priority service feature code (e.g., *272). The authority of the wireless caller to place such a call is checked and if that caller has the authority the wireless priority service (WPS) feature indication is passed along with the call. In accordance with the prior art, routing for the call is accomplished by first routing the call to the home switch of the terminating party (referred to as the in-call switch). That home switch queries the home location register (HLR) to find a last-seen pointer to identify the mobile switching center in which the called party had most recently registered. If this last-seen pointer is the same as the in-call switch then the call is routed directly to the destination mobile station and, if the call has a priority indicator, then, if there are no radio resources available, the call is placed in a preferred queue so that the call is given preference over other calls competing for the same radio resources. Other calls can be completed but will have a lower priority access to the radio resources. If the last-seen pointer points to a different switch then a request is sent to the last-seen switch, the request including the mobile station identifier, and the last-seen switch returns a Temporary Local Directory Number (TLDN) to the in-call switch. The call is then routed from the in-call switch using the TLDN, to the last-seen switch, referred to as the anchor switch.

If the anchor switch pages the mobile station and fails to receive a response, the anchor switch sends a request to a group of neighboring switches called border switches to page the mobile station.

Applicants have found a number of problems with the present arrangement with respect to the completion of high priority calls to wireless stations.

SUMMARY OF THE INVENTION

Applicants have carefully analyzed the present arrangement and have identified several problems.

1. Border switches cannot provide priority service for a call.
2. Priority service is not augmented with preemption service.
3. Priority service can only be requested from mobile stations.

Applicants have studied these restrictions and have found arrangements for overcoming these flaws in accordance with the present invention wherein priority or preempt requests are passed from a last-seen switch (anchor switch) to the border switch in which a mobile has responded to a page; this border switch then offers priority or preempt service for this call. Further, calls to terminating wireless stations can be originated from authorized wireline stations by passing the priority request. Advantageously, priority service from wireless to wireless stations is not restricted only to calls served from an in-call switch or an anchor switch, and priority and preempt service to wireless stations can be provided for calls originated from wireline stations.

In accordance with one feature of Applicants' invention, authorized land based stations can dial the WPS feature code and can thereby be provided with wireless priority service for calls to wireless stations. In particular, wireless priority service is provided to many subscribers having Government Emergency Telecommunication Service (GETS).

In accordance with another feature of Applicants' invention, preemption as well as priority is offered, the level of preemption being defined in the same database which is used for authorizing priority service. With preemption service if a call cannot be completed because of the unavailability of radio resources, then depending on the type of preemption service, a radio channel can be preempted immediately, after a timeout, or after a queue timer expires. Alternatively and/or additionally, preemption can be exercised prior to, during or after trunk queuing at an originating, in-call, transit and terminating switch.

In accordance with one feature of Applicants' invention, a plurality of new preemption levels are provided in messages to the anchor switch; for each call that is a preempting call the level of preemption is stored. In making the decision of which call should be preempted, calls which are not priority calls are first candidates, priority without preemption calls are second candidates, and preempting calls are third candidates, the level of preemption being used to differentiate among such calls.

BRIEF DESCRIPTION OF THE DRAWING(S)

FIG. 1 is a block diagram illustrating the operation of Applicants' invention; and FIGS. 2A and 2B are flow diagrams illustrating the operation of Applicants' invention.

DETAILED DESCRIPTION

FIG. 1 is a block diagram illustrating the operation of Applicants' invention. An originating wireless party 1 or wireline party 3 dials a wireless priority service (WPS) feature code or some other digit combination (e.g., from GETS callers) which is transmitted as part of the dialing information 5 or 6 to an originating party serving mobile switching center 10 or an originating landline switch 15. Other users, such as those having GETS service, have their authorization checked using a different protocol. The mobile switching center verifies the authority of the caller to make priority calls by sending a validation request to a wireless switching control point 11, or some other database containing subscriber profile data such as the HLR. Similarly, the originating landline switch 15 verifies the authority of the caller to place a priority call to a wireless station by sending a validation request to service control point 16 connected to originating switch 15, or some other database such as the HLR. In an alternative configuration, a single Switching Control Point (SCP), such as SCP 11 can serve both switches 10 and 15. If the call is authorized then a signaling message including the wireless priority service indicator 17 or 18 is sent to the public switched telephone network/public land mobile network (PSTN/PLMN) 20. The network identifies the in-call mobile switching center (MSC) based on the dialed telephone number. This in-call mobile switching center is (typically) the home switch of the called party. The in-call mobile switching center 30 queries home location register (HLR) 32 to identify a last-seen switch which is the switch in which the called mobile station most recently registered. This can be the in-call MSC or it can be another MSC referred to as the anchor MSC. The in-call MSC receives the WPS indicator 31 and if the anchor MSC is not the same as the in-call MSC, the in-call MSC sends a WCI (WPS Call Indicator) to the HLR, thence to anchor MSC. If the anchor MSC cannot successfully locally page the called party, the anchor MSC requests the surrounding MSCs called border system 50, . . . ,51 to page the destination mobile station. Such a page may occur simultaneously with the local page. In this example, the destination mobile station 2 is successfully paged by border system 50. Border system 50 has received a WCI indicator 55 to indicate that this is a priority call. If no radio channels are available, the border system acts accordingly by giving the call priority over other calls queued for radio resources. The border system puts the call in a priority queue for the next available radio channel or other facility set based on the priority level and arrival time.

The authorization of a caller to place a priority or preemption call is registered as part of the caller's class of service. In accordance with the invention, if a caller has a class of service allowing a range of priority services, the caller can request a higher or lower priority service, and presumably be charged a higher or lower amount, by dialing an appropriate prefix.

FIG. 2 is a flow diagram illustrating the operation of Applicants' invention. A caller originates at a local switch (action block 201). In accordance with Applicants' invention, this local switch can be an MSC or a landline switch. In this example, the calling customer prefixes a wireless priority service code to the called number (action block 203). The call is routed via the global public switched telephone network/public land mobile network (PSTN/PLMN) to the home switch of the terminating party referred to for purposes of these calls as the in-call switch (action block 205). The in-call switch is identified by the telephone number of the called party.

The in-call switch queries a home location register (HLR) with a location request (action block 207). The HLR looks at the last-seen pointer for the called mobile station (test 209). If the last-seen pointer points to the in-call switch then the HLR returns a mobile station identifier which allows the in-call switch to complete the call (action block 211). If the last-seen pointer points to another switch then a request is sent to the last-seen switch, the request including the called mobile station identifier (action block 213). The last-seen switch returns the TLDN to the in-call switch (action block 215). The call is then routed from the in-call switch using the TLDN to the last-seen switch which is the anchor switch (action block 217). The anchor switch attempts to page the called mobile station (action block 219) and sends page requests to border switches. Test 221 determines whether the called mobile station has been successfully paged in the anchor switch. If the called station has been successfully paged in the anchor switch, the call is completed as in the prior art (action block 223) except that preemption (as described below for the border systems) may also be applied in the anchor switch. The intersystem page request including the WCI parameter received at the border systems of the anchor switch, is processed (action block 225). The border systems page the called mobile station and the mobile station responds to the page in one of the border systems (action block 227). Test 229 determines whether radio facilities are available in that border switch. If not, then if the call has immediate preemption priority, abort an existing non-priority call and assign its radio channel to this new incoming call (action block 231). If the call does not have immediate preemption priority, place the incoming call in a priority queue and start queue timer and, if applicable, a preemption timer (action block 233). When an idle radio channel becomes available, assign it to the highest priority call in the queue(s) (action block 235). If the preemption timer expires, abort an existing non-priority call and assign its radio channel to this call (action block 237). If the queue timer expires and the call has preemption priority, abort an existing non-priority call and assign its radio channel to the call (action block 239). For calls that do not have preemption priority, the call can be discarded when its queue timer expires. For any call to which a radio channel has been assigned, continue with call set-up (action block 241).

The above description is of one preferred embodiment of Applicants' invention. Other embodiments will be apparent to those of ordinary skill in the art without departing from the scope of the invention. The invention is limited only by the attached claims.

We claim:

1. A method of establishing a priority call to a border switch of a wireless telecommunications network comprising the steps of:

identifying said priority call with an indication of a priority status;

transmitting said indication of said priority status to a last-seen switch of said wireless telecommunications network in which a called station of said call was most recently registered;

attempting to complete said call by said last-seen switch;

paging said called station in border switches of said last-seen switch;

responsive to receiving a positive response to said paging by a terminating border switch, transmitting another indication of said priority status to said terminating border switch;

in said terminating border switch, giving priority status to establish said call.

2. The method of claim 1 wherein the step of identifying said priority call comprises the step of receiving a priority indicator as part of the dialed information from a caller of said priority call.

3. The method of claim 1 wherein the step of transmitting another indication comprises the step of transmitting said another indication from said last-seen switch to said terminating border switch.

4. The method of claim 1 wherein the step of giving priority status to establish said call in said terminating border switch comprises the step of entering said call in a separate queue having preferred access to resources required to establish said call.

5. The method of claim 1 wherein the step of identifying said priority call comprises the step of verifying authorization of an originator of said priority call to place priority calls.

* * * * *